US011759847B2

(12) United States Patent
Deters et al.

(10) Patent No.: US 11,759,847 B2
(45) Date of Patent: Sep. 19, 2023

(54) METHOD FOR CONSTRUCTING MOLDS AND CORES LAYER BY LAYER BY MEANS OF A BINDER CONTAINING WATER GLASS, AND A BINDER CONTAINING WATER GLASS

(71) Applicant: ASK Chemicals GmbH, Hilden (DE)

(72) Inventors: Heinz Deters, Duesseldorf (DE); Henning Zupan, Wuppertal (DE)

(73) Assignee: ASK Chemicals GmbH, Hilden (DE)

( * ) Notice: Subject to any disclaimer, the term of this patent is extended or adjusted under 35 U.S.C. 154(b) by 0 days.

(21) Appl. No.: 18/046,191

(22) Filed: Oct. 13, 2022

(65) Prior Publication Data
US 2023/0059329 A1    Feb. 23, 2023

Related U.S. Application Data

(63) Continuation of application No. 15/534,551, filed as application No. PCT/DE2015/000589 on Dec. 11, 2015, now abandoned.

(30) Foreign Application Priority Data

Dec. 12, 2014 (DE) ..................... 10 2014 118 577.3

(51) Int. Cl.
| | |
|---|---|
| C04B 35/63 | (2006.01) |
| C04B 35/14 | (2006.01) |
| B33Y 10/00 | (2015.01) |
| B33Y 50/02 | (2015.01) |
| B22C 9/10 | (2006.01) |
| B28B 1/00 | (2006.01) |
| B28B 11/24 | (2006.01) |
| B22C 1/18 | (2006.01) |
| B33Y 70/00 | (2020.01) |
| B29C 64/165 | (2017.01) |
| B32B 18/00 | (2006.01) |
| B22C 9/02 | (2006.01) |
| B33Y 80/00 | (2015.01) |

(52) U.S. Cl.
CPC ............... *B22C 1/188* (2013.01); *B22C 9/02* (2013.01); *B22C 9/10* (2013.01); *B28B 1/001* (2013.01); *B28B 11/241* (2013.01); *B29C 64/165* (2017.08); *B32B 18/00* (2013.01); *B33Y 10/00* (2014.12); *B33Y 50/02* (2014.12); *B33Y 70/00* (2014.12); *B33Y 80/00* (2014.12); *C04B 35/14* (2013.01); *C04B 35/6303* (2013.01); *C04B 35/6313* (2013.01); *C04B 35/6316* (2013.01); *C04B 2235/3201* (2013.01); *C04B 2235/3409* (2013.01); *C04B 2235/3427* (2013.01); *C04B 2235/5427* (2013.01); *C04B 2235/5436* (2013.01); *C04B 2235/6026* (2013.01); *C04B 2235/667* (2013.01); *C04B 2237/704* (2013.01); *Y02P 10/25* (2015.11)

(58) Field of Classification Search
CPC ....... B33Y 10/00; B22C 1/188; B22C 1/2253; B22C 1/18; B22C 9/02; B22C 9/10; B22C 9/12; B28B 1/001; C04B 28/26; C04B 35/14; C04B 35/6303; C04B 35/6313; C04B 35/6316
See application file for complete search history.

(56) References Cited

U.S. PATENT DOCUMENTS

| | | | |
|---|---|---|---|
| 4,347,890 A * | 9/1982 | Ailin-Pyzik | B22C 1/188 264/432 |
| 5,024,055 A | 6/1991 | Sato et al. | |
| 5,204,055 A | 4/1993 | Sachs et al. | |
| 6,139,619 A * | 10/2000 | Zaretskiy | C04B 28/26 106/629 |
| 7,807,077 B2 * | 10/2010 | Hochsmann | B33Y 70/10 264/219 |
| 8,741,194 B1 | 6/2014 | Ederer et al. | |
| 10,232,430 B2 | 3/2019 | Muller et al. | |
| 2003/0133822 A1 | 7/2003 | Harryson | |
| 2004/0056378 A1 | 3/2004 | Bredt et al. | |
| 2010/0173767 A1 | 7/2010 | Kock et al. | |
| 2010/0294454 A1 | 11/2010 | Muller et al. | |
| 2010/0326620 A1 * | 12/2010 | Muller | B22C 9/12 164/349 |
| 2015/0246387 A1 | 9/2015 | Bartels et al. | |
| 2016/0059301 A1 | 3/2016 | Muller et al. | |

FOREIGN PATENT DOCUMENTS

| | | |
|---|---|---|
| DE | 10 2007 045649 A1 | 4/2009 |
| DE | 10 2011 053205 A1 | 3/2013 |
| DE | 10 2012 020510 A1 | 4/2014 |
| DE | 10 2012 020511 A1 | 4/2014 |
| WO | 2012175072 A1 | 12/2012 |
| WO | 2013017134 A1 | 2/2013 |

* cited by examiner

*Primary Examiner* — Michael P Wieczorek
(74) *Attorney, Agent, or Firm* — Standley Law Group LLP; Jeffrey S. Standley; Kenny W. Pung

(57) ABSTRACT

The invention relates to a binder, which contains water glass and further a phosphate or a borate or both. The invention further relates to a method for constructing molds and cores layer by layer, the molds and cores comprising a construction material mixture, which at least comprises a refractory molding base material, and the binder. In order to produce the molds and cores layer by layer in 3-D printing, the refractory molding base material is applied layer by layer and is selectively printed with the binder layer by layer, and consequently a body corresponding to the molds or cores is constructed and the molds or cores are released after the unbonded construction material mixture has been removed.

18 Claims, No Drawings

METHOD FOR CONSTRUCTING MOLDS AND CORES LAYER BY LAYER BY MEANS OF A BINDER CONTAINING WATER GLASS, AND A BINDER CONTAINING WATER GLASS

The invention relates to a method for constructing molds and cores layer by layer, the molds and cores comprising a refractory molding base material and a binder containing least one aqueous alkali silicate solution and further a phosphate or a borate or both. In order to produce molds and cores layer by layer in 3-D printing it is necessary to apply a refractory molding base material layer by layer and to selectively print each with the binder. Furthermore, the invention relates to molds or cores produced in this way.

PRIOR ART

Casting molds essentially consist of cores and molds, which represent the negative forms of the casting to be produced. These cores and molds consist of a refractory material, for example quartz sand, and a suitable binder which imparts sufficient mechanical strength to the casting mold after removal from the forming die. For the production of casting molds, therefore, a refractory molding base material is used, which is coated with a suitable binder. The refractory molding base material is preferably in a free-flowing form so that it can be filled into a suitable hollow mold. The binder creates a firm cohesion between the particles/granules of the molding base material so that the casting mold is given the required mechanical stability.

Casting molds have to meet various requirements. In the casting process itself, they firstly have to have sufficient stability and heat resistance to accommodate the liquid metal in the hollow space formed by one or more (parts of) casting molds. After commencement of solidification, the mechanical stability of the casting mold is ensured by a solidified metal layer which forms along the walls of the casting mold. The material of the casting mold then has to decompose under the action of the heat given off by the metal so that it loses its mechanical strength, i. e. cohesion between individual particles/granules of the refractory material is lost. In the ideal case the casting mold disintegrates again to leave a fine sand which can be poured from the casting mold of the casting.

The designation "rapid prototyping" includes various known methods for the production of three-dimensional bodies by constructing them layer by layer. An advantage of these methods is the possibility of producing even complex single-piece bodies with undercuts and cavities. By conventional methods these bodies would have to be assembled from several, individually produced parts. A further advantage is that the methods are capable of producing the bodies without molding dies directly from the CAD data.

As a result of the 3-dimensional printing methods, novel requirements are imposed on binders which hold the casting mold together when the binder or a binder component is to be applied through the nozzles of a print head. The binders must then not only lead to a sufficient strength level and to good disintegration properties after the metal casting, and also have sufficient thermal and storage stability, but also now must be "printable", that is, the nozzles of the print head can not be blocked by the binder, on the other hand, the binder should also not be able to flow directly out of the print head but instead form single droplets.

Furthermore, more and more frequently, it is required that no emissions in the form of $CO_2$ or hydrocarbons occur during the production of the casting molds as well as during casting and cooling in order to preserve the environment and to limit the odor pollution of the environment by hydrocarbons, mainly by aromatic hydrocarbons. In order to meet these requirements, inorganic binding systems have been developed or further developed in recent years. Their use leads to the avoidance or at least minimization of emissions of $CO_2$ and hydrocarbons during the production of metal molds.

EP 1802409 B1 discloses an inorganic binder system with which it is possible to produce molds with sufficient stability. However, the binder system is particularly suitable for thermal curing in a core firing machine in which a previously mixed molding material mixture (mixture of refractory material and binder) is conveyed into the heated molding die by means of pressure.

WO 2012/175072 A1 discloses a method for constructing models layer by layer, wherein an inorganic binder system is used. The particulate material applied layer by layer comprises a particulate construction material and a spray-dried alkali silicate solution. The selective activation of the curing is carried out by means of a solution comprising water, which is added by means of the print head. Both pure water and modified water containing rheological additives are disclosed. Rheological additives mentioned are exemplified by thickening agents, such as glycerol, glycol or layered silicates, the layered silicates being particularly emphasized. WO 2012/175072 A1 does not disclose the use of aqueous alkali silicate solutions. The binder or the water-glass solution is not dosed via the print head, but is already contained in the particulate material applied layer by layer. The selective wetting or setting of a material applied layer by layer by means of a binder is achieved according to WO 2012/175072 A1 only by a detour and not directly by means of an aqueous alkali silicate solution. The process described in WO 2012/175072 A1 provides the binder, the spray-dried alkali silicate solution, not only at the intended destination, but also in areas in which it is not required. Thus, the binder is consumed unnecessarily.

DE 102011053205 A1 discloses a method for producing a component in deposition technology in which, inter alia, water glass is used as a printing liquid in addition to many other options. Accordingly, the water glass can be dosed by means of a print head and applied to a predetermined section of the respectively uppermost layer. DE 102011053205 A1, however, does not provide information as to which water glass compositions can be used. The person skilled in the art is also not given any information about the physical properties of the water glasses used, which could have indicated a chemical composition. Only in the described prior art inorganic binders (such as, e. g., free-flowing water glass) are mentioned quite generally, which generally contain large amounts of moisture—as an example, only up to 60% by weight water is mentioned. The large amounts of water (e. g. up to 60% by weight water) are thought to be disadvantageous since they are difficult to handle.

The person skilled in the art is not given any information as to which water glass compositions are suitable for 3-D printing by DE 102011053205 A1.

WO 2013/017134 A1 discloses an aqueous alkali silicate solution having a viscosity of 45 mPa·s or less at 20° C., which has a solids content with respect to the alkali silicate of 39% by weight. The ratio between $SiO_2$ and $M_2O$ ($M_2O$ is $Na_2O$ and/or $K_2O$) is stated as the weight ratio. The narrowest limits of this weight ratio are between 1.58 and 3.30. In the examples of WO2013/017134 A1, a method is disclosed with which it appears possible to lower the viscosity of water glass binders by means of a ball mill. However, such a method is very complex and cost-intensive.

THE OBJECT OF THE INVENTION

The inventors are therefore faced with the object of developing a water glass binder or an aqueous alkali silicate solution which is suitable for the 3-dimensional printing of casting molds, i. e., the water glass binder can be selectively dosed directly via a print head without blocking or clogging the nozzles or the module of the print head. Furthermore, the binder should be applied as finely, punctiformly and in a precisely defined dose. Moreover, the use of the water glass according to the invention leads to positive properties of the molds produced therewith.

SUMMARY OF THE INVENTION

This object is achieved with a binder having the features of the independent claims. Advantageous further developments of the method according to the invention are the subject matter of the dependent claims or described below. The method for constructing bodies layer by layer comprises at least the following steps:
a) providing a refractory molding base material as a component of a construction material mixture;
b) spreading a thin layer of the construction material mixture with a layer thickness of 0.05 mm to 3 mm, preferably 0.1 mm to 2 mm and particularly preferably 0.1 mm to 1 mm of the construction material mixture;
c) printing selected areas of the thin layer with a binder, comprising
water glass in the form of an aqueous alkali silicate solution, and
at least one phosphate or at least one borate or phosphate and borate, preferably in a dissolved form in a at least partial, in particular completely aqueous solution; and
d) repeatedly repeating steps b) and c).

When the water-glass binder according to the invention is used, the casting molds produced therewith have the following properties:
1. good strength, especially after thermal curing
2. sufficient thermostability, particularly suitable for metal casting, to prevent deformation of the casting mold during the casting process.
3. good storage stability
4. good disintegration properties after metal casting
5. no emissions of $CO_2$ or other organic pyrolysis products during the casting operation and cooling, unless organic additives are present in the particulate material applied layer by layer, or in the water glass binder.

Surprisingly, it has been found that the binder according to the invention is very readily "printable", that is to say the nozzles of the printing head are not rapidly blocked by the binder. At the same time, the binder can be applied very finely. A clogging of the nozzles of the print head would lead to a poor print result. This is avoided by the binder according to the invention.

A rapid clogging of the nozzles or a rapid film formation at the module of the print head is due to an increased reactivity of the binder. The reactivity of the binder can be controlled by its chemical composition as well as the thermal stability of the binder. In view of the application in the area of the 3-D printing method, on the one hand, a low reactivity of the binder is required in order to avoid impairment of the print head and to control the curing of the binder, but on the other hand, high thermal stability is desired also in order to prevent the produced casting molds from deforming during the casting operation and thus resulting in poor dimensional stability of the casting. The thermostability and reactivity of the binder depend in the same manner on the chemical composition of the binder, i. e., the higher the reactivity, the higher the thermal stability. It is the subject matter of this invention to disclose a suitable binder composition which ensures a sufficiently high thermostability of the casting molds at sufficiently low reactivity of the binder.

DETAILED DESCRIPTION OF THE INVENTION

The binder according to the invention is provided for the 3-dimensional printing of casting molds. The binder serves as a printing liquid, by means of which a material applied layer by layer, such as, for example, a refractory molding base material (e. g. quartz sand) and optionally one or more additives, collectively referred to as a construction material mixture, is selectively printed. The construction material mixture does not yet contain the binder. Usually a selective printing operation follows the layer by layer application of the construction material mixture—this operation is repeated until the entire printing operation is completed and the casting mold can be obtained.

The curing of the binder can be carried out in conventional ways. Thus, on the one hand, it is possible to add one or more water glass curing agents to the construction material mixture applied layer by layer, which produce the immediate curing of the printed water glass-containing binder by chemical means.

It is also possible to cure the applied water glass by means of acidic gases, such as $CO_2$—but this variant is less preferred.

On the other hand, thermal curing can also take place. It is, for example, possible for thermal curing to be carried out after completion of a printing operation (immediately before, during or after the next layer of the construction material mixture is applied), by irradiating the mixture of construction material mixture and binding agent, for example, by means of an infrared light. In this layer by layer curing, the infrared light, for example in the form of a spot, can follow the print head. It is, of course, also possible to carry out this type of thermal curing step by step after several layers have been applied. It is also possible to carry out the thermal curing only after completion of the last printing operation. The steps "applying a layer of the construction material mixture" and subsequent "printing operation" alternate until the last layer has been printed which is necessary to produce the casting mold completely. For this purpose, the applied and partially printed layers remain, for example in a so-called "job box", which subsequently can be transferred to a microwave oven to perform thermal curing.

Thermal curing is preferred, in particular drying by means of microwaves and preferably after completion of the entire printing operation in the microwave oven.

Customary and known materials can be used as the refractory molding base materials for the production of casting molds. Suitable materials are, for example, quartz, zirconium or chromium ore sand, olivine, vermiculite, bauxite, fire clay as well as artificial molding base materials, in particular more than 50% by weight quartz sand based on the refractory molding base material. In order to keep costs low, the proportion of quartz sand of the refractory molding base material is greater than 70% by weight, preferably greater than 80% by weight and particularly preferably greater than 90% by weight. It is not necessary, however, to use exclusively new sands. In the sense of saving resources and avoiding landfill costs, it is even advantageous to use as high a proportion of regenerated old sand as is obtainable from used forms by recycling.

A refractory molding base material is understood to mean substances which have a high melting point (melting temperature). The melting point of the refractory molding base material is preferably greater than 600° C., preferably greater than 900° C., particularly preferably greater than 1200° C. and very particularly preferably greater than 1500° C.

The refractory molding base material preferably makes up greater than 80% by weight, in particular greater than 90% by weight, particularly preferably greater than 95% by weight, of the construction material mixture.

A suitable refractory molding base material is described, for example, in WO 2008/101668 A1 (=US 2010/173767 A1). Likewise suitable are regenerates which are obtainable by washing and subsequent drying of comminuted used molds. Generally, the regenerates can make up 70% by weight of the refractory molding base material, preferably at least about 80% by weight and particularly preferably greater than 90% by weight.

According to one embodiment of the invention, it is advantageous to use regenerates which have been obtained by purely mechanical treatment. A mechanical treatment is understood to mean that at least a portion of the binder remaining in the old sand is removed from the sand grain by a grinding or impacting principle. These regenerates can be used as needed. The proportion of these regenerates can, for example, be greater than 5% by weight, preferably greater than 20% by weight, more preferably greater than 50% by weight, particularly preferably greater than 70% by weight and very particularly preferably greater than 80% by weight, of the refractory molding base material. Such regenerates are used, for example, to effect a (pre- or partial) curing of the applied binder.

According to one embodiment of the invention, it is advantageous to use salts as a molding base material. Salts are understood to mean alkali halides and alkaline earth halides. Alkali halides are preferred, of which the alkali metal chlorides are more preferred. Particularly preferably, sodium chloride is used. The proportion of the salts or the salt can make up, for example, greater than 5% by weight, preferably greater than 20% by weight, more preferably greater than 50% by weight, more preferably greater than 80% by weight, of the refractory molding base material. It is particularly preferred in this embodiment to use only the salt as a refractory molding base material. Salts are used, for example, when the casting mold is to be removed after the metal casting by means of water.

The mean grain diameter of the refractory molding base material is generally between 50 µm and 600 µm, preferably between 70 µm and 400 µm, preferably between 80 µm and 300 µm, and particularly preferably between 100 µm and 200 µm. The grain diameter can be determined, for example, by sieving according to DIN ISO 3310. Particularly preferred are particle shapes/grains having the greatest longitudinal extent to the smallest longitudinal extent (at right angles to one another and in each case for all spatial directions) of 1:1 to 1:5 or 1:1 to 1:3, i. e., those which are non-fibrous, for example.

The refractory molding base material is in a free-flowing state.

The binder according to the invention contains water glasses which are prepared, for example, by dissolving glassy lithium, sodium and/or potassium silicates in water. Preferred water glasses are those which contain at least sodium silicates.

The ratio $Na_2O/M_2O$ in the binder is preferably greater than 0.4, preferably greater than 0.5 and more preferably greater than 0.6 and particularly preferably greater than 0.7, wherein $M_2O$ is the sum of the mass quantities of lithium, sodium and potassium calculated as oxide in the binder.

According to the present invention, the amounts of the alkali metals, calculated as oxides $M_2O$, are calculated exclusively from the molar amounts of amorphous alkali silicates, alkali oxides, alkali hydroxides, alkali phosphates and alkali borates present in the binder. This means that any additions such as alkali chloride or alkali carbonates to the water glass solution are not included in the calculation of $M_2O$ ($M_2O$ in each case as defined in the previous paragraph).

The water glass has a molar modulus $SiO_2/M_2O$ of greater than 1.4, preferably greater than 1.6, preferably greater than 1.8, more preferably greater than 1.9, and particularly preferably greater than 2.0. The water glass preferably has a molar modulus $SiO_2/M_2O$ of less than 2.8, preferably less than 2.6, preferably less than 2.5, particularly preferably less than 2.4. In this context, it is surprising for the person skilled in the art that such low molar ratios $SiO_2/M_2O$ of the water glass solutions according to the invention lead to a sufficiently high thermostability of the casting mold, in particular in metal casting.

The binder has a solids content of less than 40% by weight, preferably less than 38% by weight, preferably less than 36% by weight, particularly preferably less than 35% by weight. The remainder of the binder preferably consists of water.

The binder has a solids content of greater than 22% by weight, preferably greater than 24% by weight, preferably greater than 26% by weight, particularly preferably greater than 28% by weight, very particularly preferably greater than 29% by weight and particularly preferably greater than 29.5%.

The solids content is determined by gently evaporating the liquid, drying the binder and then heating it at 600° C. for 1 h in an air atmosphere. The remaining oxidic material is weighed to determine the solids content.

Irrespective of this, the amount of material of $SiO_2$ and $M_2O$ (calculated as mol %) in the binder is less than 16 mol %, preferably less than 15 mol %, preferably less than 14 mol %, particularly preferably less than 13.5 mol %. Furthermore, this amount of material is greater than 7 mol %, preferably greater than 8 mol %, preferably greater than 9 mol %, particularly preferably greater than 10 mol % and very particularly preferably greater than 10.5 mol %.

The viscosity of the binder must not be too low and not too high. The dynamic viscosity is measured using a Brookfield rotation viscometer. At a temperature of 25° C., the binder according to the invention has a viscosity of less than 25 mPas, preferably less than 20 mPas, preferably less than 18 mPas, and particularly preferably less than 16 mPas. At a temperature of 25° C., the binder has a viscosity of greater than 1 mPas, preferably greater than 2 mPas, preferably greater than 3 mPas, and particularly preferably greater than 4 mPas.

The binder according to the invention should be a clear solution and, if possible, free of coarser particles, which in their greatest extent have a size between several micrometers to several millimeters and can originate, for example, from impurities. Commercially available water glass solutions generally have these coarser particles.

Particle or grain sizes are determined by means of dynamic light scattering in accordance with DIN/ISO 13320 (e. g. Horiba LA 950).

The determined D90 value (in each case based on volume) is the measure for the larger particles—it means that 90% of the particles are smaller than the specified value. The water glass according to the invention has a D90 value (determined by dynamic light scattering or laser diffractometry) of less than 70 μm, preferably less than 40 μm, preferably less than 30 μm, particularly preferably less than 25 μm, and very particularly preferably less than 20 μm.

Irrespective of this, the water glass according to the invention has a D100 value (in each case based on volume) of less than 250 μm, preferably less than 120 μm, preferably less than 50 μm, more preferably less than 40 μm, particularly preferably less than 35 μm, and very particularly preferably less than 30 μm.

The binders described above containing water glasses can be obtained, for example, by suitable filtration. For example, filters with a sieve diameter of 50 μm, preferably of 25 μm, preferably 10 μm, and particularly preferably 5 μm, are suitable. Preferred binders are those which contain no particles with a size of at least 1 μm.

In one embodiment, the binder according to the invention can have proportions of lithium ions. The molar ratio of $Li_2O/M_2O$ can vary over wide ranges, for example between 0.01 and 0.3. Preferably, the ratio is in the range between 0.03 and 0.17, preferably between 0.035 and 0.16, and particularly preferably between 0.04 and 0.14.

In one embodiment, the binder according to the invention can have proportions of potassium ions. The molar ratio of $K_2O/M_2O$ can vary over wide ranges, for example between 0.01 and 0.3. Preferably, the ratio is in the range between 0.01 and 0.17, preferably between 0.02 and 0.16 and particularly preferably between 0.03 and 0.14.

Surprisingly, it has been shown that an addition of network-former agents other than silicate can both increase the thermostability and reduce the reactivity. A network-forming agent from the group of phosphates is therefore added to the binder and dissolved in the binder, in particular alkali phosphates (e. g. sodium hexametaphosphate or sodium polyphosphates) have been found to be beneficial. Among the alkali phosphates, alkali orthophosphates such as trisodium phosphate ($Na_3PO_4$) are not preferred. Sodium polyphosphates and/or sodium metaphosphates are particularly preferred.

Other network-forming agents which can be added to the binder alternatively or additionally are borates, in particular alkali borates, e. g., disodium tetraborate decahydrate. These, too, are dissolved in the binder.

The amounts of the alkali metals which result from the proportions of the alkali borates and/or alkali phosphates in the total amount of the binder (including diluent) are calculated as oxides and contribute to the total amount of material (i. e. the sum of the individual amounts of material) of lithium, sodium and potassium oxide in the total aqueous solution. Consequently, the molar modulus $SiO_2/M_2O$ is also influenced by the addition of alkali borates and/or alkali phosphates.

The content of borates in the binder, in particular the content of alkali borates, is calculated as $B_2O_3$. The molar ratio of $B_2O_3/SiO_2$ can vary over wide ranges, for example from 0 to 0.5. This ratio is preferably less than 0.3, preferably less than 0.2, particularly preferably less than 0.1, very particularly preferably less than 0.08 and most particularly preferably less than 0.06. Preferably, this ratio is greater than or equal to zero. In a further embodiment, this ratio is preferably greater than 0.01, particularly preferably greater than 0.02. Borates in the context of the invention are boron compounds in the oxidation state III, which are only directly bonded to oxygen, i. e., oxygen atoms are the direct bonding partners of the boron in the compound.

The content of phosphates in the binder, in particular the content of alkali phosphates, is calculated as $P_2O_5$. The molar ratio of $P_2O_3/SiO_2$ can vary over wide ranges, for example from 0 to 0.5. This ratio is preferably less than 0.4, preferably less than 0.3, more preferably less than 0.25, particularly preferably less than 0.2 and very particularly preferably less than 0.15. This ratio is preferably greater than 0, preferably greater than 0.01, particularly preferably greater than 0.02.

Phosphates in the context of the invention are phosphorus compounds in the oxidation state V, which are only directly bonded to oxygen, i. e. oxygen atoms are the direct bonding partners of the phosphorus in the compound.

In a further embodiment, the binder can also contain aluminum, wherein the proportion of the aluminum being then calculated as $Al_2O_3$. The proportion of $Al_2O_3$ is then usually less than 2% by weight, based on the total weight of the binder.

In a preferred embodiment, surface-active substances may be added to the binder according to the invention in order to influence the surface tension of the binder. The proportion of these surface-active substances is generally between 0.01 and 4.0% by weight, preferably between 0.1 and 3.0% by weight.

Suitable surface-active substances in the binder are, for example, described in DE 102007051850 A1, including preferably anionic surfactants which carry a sulfate and/or sulfonate group. Further suitable surface-active substances are, for example, polyacrylate salts (e. g. of sodium—for example Dispex N40-Ciba) or silicone surfactants for aqueous systems (e. g. Byk 348, Altana). Surface-active substances based on trisiloxane or glycol (e. g. polyethylene glycol) can be used.

Depending on the application and the desired strength level, preferably between 0.5% by weight and 7% by weight of binder, based on the water glass is used, preferably between 0.75% by weight and 6% by weight, particularly preferably between 1% by weight and 5.0% by weight, and particularly preferably between 1 by weight and 4.0% by weight, based in each case on the molding base material. The data relate to the total amount of the water-glass binder, including the (in particular aqueous) solvent or diluent and the solids content (if any) (together=100% by weight).

In a preferred embodiment, the construction material mixture may contain a proportion of a particulate amorphous silica to enhance the strength level of the casting molds. An increase in the strengths of the casting molds, in particular the increase in the hot strengths, can be advantageous in the automated production process. Synthetically produced amorphous silica is particularly preferred.

The mean particle size (including any agglomerates) of the amorphous silica is preferably less than 300 μm, preferably less than 200 μm, particularly preferably less than 100 μm. The sieve residue of the particulate amorphous $SiO_2$ is preferably not more than 10% by weight, particularly preferably not more than 5% by weight, and very particularly preferably not more than 2% by weight, when passing through a sieve of 125 μm mesh (120 mesh).

Irrespective of this, the sieve residue on a sieve with 63 μm mesh is less than 10% by weight, preferably less than 8% by weight. The sieve residue is determined according to the machine sieving method described in DIN 66165 (part 2), in which case a chain ring is additionally used as sieving aid.

The particulate amorphous silicon dioxide preferably used according to the present invention has a water content of less than 15% by weight, in particular less than 5% by weight and particularly preferably less than 1% by weight.

The particulate amorphous $SiO_2$ is used as a powder (including dusts).

Both synthetically produced and naturally occurring silicic acids can be used as amorphous $SiO_2$. The latter are known, for example, from DE 102007045649, but are not preferred, since they usually contain not insignificant crystalline proportions and are therefore classified as carcinogens. Synthetic is understood to mean non-naturally occurring amorphous $SiO_2$, i. e., its preparation comprises a deliberately performed chemical reaction, as is caused by a human, e. g. the production of silica sols by ion exchange processes from alkali silicate solutions, the precipitation from alkali silicate solutions, the flame hydrolysis of silicon tetrachloride, the reduction of quartz sand with coke in the arc furnace in the production of ferrosilicon and silicon. The amorphous $SiO_2$ produced by the two last-mentioned methods is also referred to as pyrogenic $SiO_2$.

On occasion, only precipitated silicic acid (CAS No. 112926-00-8) and $SiO_2$ produced by flame hydrolysis (pyrogenic silica, fumed silica, CAS No. 112945-52-5) are understood to mean synthetic amorphous silicon dioxide, whereas the product formed in ferrosilicon or silicon production is merely referred to as amorphous silicon dioxide (silica fume, microsilica, CAS No. 69012-64-12). For the purposes of the present invention, the product formed in ferrosilicon or silicon production is also considered an amorphous $SiO_2$.

Precipitated silicic acids and pyrogenic, i. e., silicon dioxide produced by flame hydrolysis or in the electric arc are used preferably. Amorphous silicon dioxide (described in DE 102012020509) produced by thermal decomposition of $ZrSiO_4$ and $SiO_2$ (described in DE 102012020510) produced by oxidation of metallic Si by means of an oxygen-containing gas are used particularly preferably. Quartz glass powder (mainly amorphous silicon dioxide), which has been produced by melting and rapid re-cooling from crystalline quartz, so that the particles are spherical and not splintered (described in DE 102012020511) are also preferred.

The mean primary particle size of the particulate amorphous silicon dioxide can be between 0.05 μm and 10 μm, in particular between 0.1 μm and 5 μm, particularly preferably between 0.1 μm and 2 μm. The primary particle size can be determined, e. g., by means of dynamic light scattering (e. g. Horiba LA 950) as well as by scanning electron micrographs (SEM images with, e. g., Nova NanoSEM 230 from FEI). Furthermore, details of the primary particle shape could be visualized up to the order of 0.01 μm using the SEM images. The silicon dioxide samples were dispersed in distilled water for the SEM measurements and then applied to an aluminum holder bonded with copper tape before the water was evaporated.

Furthermore, the specific surface area of the particulate amorphous silicon dioxide was determined by means of gas adsorption measurements (BET method) according to DIN 66131. The specific surface area of the particulate amorphous $SiO_2$ is between 1 and 200 m$^2$/g, in particular between 1 and 50 m$^2$/g, particularly preferably between 1 and 30 m$^2$/g. Optionally, the products can also be blended, e. g., in order to obtain mixtures with specific particle size distributions.

Depending on the type of production and the producer, the purity of the amorphous $SiO_2$ can vary widely. Suitable types have a silicon dioxide content of at least 85% by weight, preferably at least 90% by weight and particularly preferably at least 95% by weight.

Depending on the application and the desired strength level, between 0.1% by weight and 2% by weight of the particulate amorphous $SiO_2$ are used, preferably between 0.1% by weight and 1.8% by weight, particularly preferably between 0.1% by weight and 1.5% by weight, based in each case on the molding base material.

The ratio of water glass-based binder to particulate amorphous silicon dioxide can be varied within wide limits.

Based on the total weight of the binder (including diluent or solvent), the amorphous $SiO_2$ is preferably present in a proportion from 1 to 80% by weight, preferably from 2 to 60% by weight, particularly preferably from 3 to 55% by weight and very particularly preferably from 4 to 50% by weight. Or Irrespective of this, based on the ratio of the proportion of solids of the water glass-based binder (based on the oxides, i. e., the total mass of alkali metal oxides $M_2O$ and silicon dioxide) to amorphous $SiO_2$ of 10:1 to 1:1.2 (weight parts) preferred.

The amorphous $SiO_2$ is added to the refractory solid or to the construction material mixture prior to the addition of the binder.

Thus, the method according to the invention is furthermore characterized by one or more of the following features when using amorphous $SiO_2$:

(a) the amorphous silicon dioxide is only added to the construction material mixture.

(b) The amorphous silicon dioxide has a BET surface area between 1 and 200 m$^2$/g, preferably greater than or equal to 1 m$^2$/g and less than or equal to 30 m$^2$/g, particularly preferably less than or equal to 15 m$^2$/g.

(c) The amorphous silica is selected from the group consisting of precipitated silicic acid, pyrogenic silicon dioxide produced by flame hydrolysis or in the electric arc, amorphous silicon dioxide produced by flame decomposition of $ZrSiO_4$, silicon dioxide produced by oxidation of metallic silicon by means of an oxygen-containing gas, quartz glass powder having spherical particles produced by melting and rapid re-cooling of crystalline quartz, and mixtures thereof, and is preferably amorphous silicon dioxide produced by thermal decomposition of $ZrSiO_4$.

(d) The amorphous silicon dioxide is preferably used in amounts of 0.1 to 2% by weight, particularly preferably 0.1 to 1.5% by weight, based in each case on the refractory molding base material.

(e) The amorphous silicon dioxide has a water content of less than 5% by weight and particularly preferably less than 1% by weight.

(f) The amorphous silicon dioxide is particulate amorphous silicon dioxide, preferably with a mean primary particle diameter determined by dynamic light scattering between 0.05 μm and 10 μm, in particular between 0.1 μm and 5 μm, and particularly preferably between 0.1 μm and 2 μm.

In a further embodiment, an inorganic curing agent for water glass-based binders is added to the construction material mixture prior to the addition of the binder. Such inorganic curing agents are, e. g., phosphates such as, for example, Lithopix P26 (an aluminum phosphate from Zschimmer and Schwarz GmbH & Co KG Chemsche Fabriken) or Fabutit 748 (an aluminum phosphate from Chemische Fabrik Budenheim KG). Other inorganic curing agents for water glass-based binders are, for example, calcium silicates and their hydrates, calcium aluminates and their hydrates, aluminum sulfate, magnesium and calcium carbonate.

The ratio of curing agent to binder may vary depending on the desired property, e. g. processing time and/or dismantling time of the construction material mixtures. Advantageously, the curing agent proportion (weight ratio of curing agent to binder and in the case of water glass the total weight of the silicate solution or other binders incorporated in solvents) is greater than or equal to 5% by weight, preferably greater than or equal to 8% by weight, particularly preferably greater than or equal to 10% by weight, based in each case on the binder. The upper limits are less than or equal to 25% by weight, based on the binder, preferably less than or equal to 20% by weight, particularly preferably less than or equal to 15% by weight.

Irrespective of this, between 0.05% by weight and 2% by weight of the inorganic curing agent are used, preferably between 0.1% by weight and 1% by weight, particularly preferably between 0.1% by weight and 0.6% by weight, based in each case on the molding base material.

As soon as the strengths allow, the unbonded construction material mixture can then be removed from the casting mold and the casting mold fed to the further treatment, for example, the preparation for metal casting. The removal of the unbonded from the bonded construction material mixture is achieved, for example, by means of an outlet so that the unbonded construction material mixture can trickle out. The bonded construction material mixture (casting mold) can, for example, be freed from residues of the unbonded construction material mixture by means of compressed air or by brushing.

The unbonded construction material mixture can be re-used for a new printing operation.

Printing is carried out, e. g., with a print head having a plurality of nozzles, the nozzles preferably being individually selectively controllable. According to a further embodiment, the print head is moved in at least one plane controlled by a computer, and the nozzles apply the liquid binder layer by layer. The print head can be, e. g., a drop-on-demand print head with bubble-jet or preferably piezo technology.

The invention claimed is:

1. A method for constructing bodies layer by layer, comprising at least the following steps:
    a) providing a refractory molding base material as a component of a construction material mixture;
    b) spreading a thin layer of the construction material mixture with a layer thickness of 0.05 mm to 3 mm;
    c) printing selected areas of the thin layer with a binder having a dynamic viscosity at 25° C. of greater than 1 mPas and less than 25 mPas, comprising
        water glass in the form of an aqueous alkali silicate solution, the water glass having a molar ratio of $Na_2O/M_2O$ of greater than 0.4 and a molar modulus $SiO_2/M_2O$ of greater 1.4 to less than 2.8, wherein $M_2O$ is the sum of the mass quantities of lithium, sodium and potassium calculated as oxide; and
        at least one phosphate dissolved in the water glass in the form of an aqueous alkali silicate solution, in a molar ratio of $P_2O_5/SiO_2$ (calculated as $P_2O_5$ and relative to $SiO_2$ in the binder) of greater than 0.01 and less than 0.5; and
    d) repeatedly repeating steps b) and c).

2. The method according to claim 1, wherein the thin layer of the construction material mixture is spread with a layer thickness of 0.1 mm to 1 mm.

3. The method according to claim 1, further comprising the step of curing the printed areas.

4. The method according to claim 3, wherein the curing is performed by temperature increase.

5. The method according to claim 4, wherein the temperature increase is effected by microwaves and/or infrared light.

6. The method according to claim 3, wherein the curing of the printed areas takes place in each case after constructing 1 to 10 printed layers of the construction material mixture.

7. The method according to claim 1, further comprising the following steps:
    i) curing the body after completion of the layer by layer construction in a furnace or by means of a microwave to obtain an at least partially cured casting mold, and subsequent
    ii) removing the unbonded construction material mixture from the at least partially cured casting mold.

8. The method according to claim 1, wherein the refractory molding base material comprises one or more members selected from the group consisting of: quartz sand, zirconium sand or chromium ore sand, olivine, vermiculite, bauxite, fire clay, glass beads, glass granules, and hollow aluminum silicate microspheres.

9. The method according to claim 8, wherein the refractory molding base material consists of more than 50% by weight of quartz sand.

10. The method according to claim 1, wherein more than 80% by weight of the construction material mixture is refractory molding base material.

11. The method according to claim 1, wherein the refractory molding base material has average grain diameters from 50 μm to 600 μm determined by sieving analysis.

12. The method according to claim 1, wherein the refractory molding base material has average grain diameters between 80 μm and 300 μm, determined by sieving analysis.

13. The method according to claim 1, wherein the water glass, including solvent/diluent, is used in an amount of between 0.5% by weight and 7% by weight based on the molding base material.

14. The method according to claim 1, wherein an inorganic curing agent for water glass-based binders is added to the construction material mixture.

15. The method according to claim 14, wherein the inorganic curing agent is a phosphate.

16. The method according to claim 14, wherein the proportion of the curing agent relative to the binder is greater than or equal to 5 to less than 25% by weight.

17. The method according to claim 14, wherein between 0.05% by weight and 2% by weight of the inorganic curing agent is used based on the molding base material.

18. The method according to claim 1, wherein the at least one phosphate is sodium hexametaphosphate or sodium polyphosphate.

* * * * *